(12) United States Patent (10) Patent No.: US 8,161,110 B2
Verhaeghe et al. (45) Date of Patent: Apr. 17, 2012

(54) METHOD AND APPARATUS FOR SCALABLE MEETINGS IN A DISCUSSION SYNTHESIS ENVIRONMENT

(75) Inventors: Paul Charles Verhaeghe, Dilbeek (BE); Baldo Faieta, Ghent (BE)

(73) Assignee: Synthetron NV, Dilbeek (BE)

( * ) Notice: Subject to any disclaimer, the term of this patent is extended or adjusted under 35 U.S.C. 154(b) by 1194 days.

(21) Appl. No.: 10/950,840

(22) Filed: Sep. 27, 2004

(65) Prior Publication Data

US 2005/0114449 A1 May 26, 2005

(30) Foreign Application Priority Data

Sep. 25, 2003 (WO) .................. PCT/EP03/10668

(51) Int. Cl.
*G06F 15/16* (2006.01)
(52) U.S. Cl. ..................................... 709/205
(58) Field of Classification Search .......... 709/201–205, 709/218; 705/1, 10–12; 706/10, 50
See application file for complete search history.

(56) References Cited

U.S. PATENT DOCUMENTS

| | | | |
|---|---|---|---|
| 5,878,214 A | 3/1999 | Gilliam | |
| 5,995,951 A | 11/1999 | Ferguson | |
| 6,347,332 B1 * | 2/2002 | Malet et al. | 709/205 |
| 7,158,960 B2 * | 1/2007 | Ferguson et al. | 706/50 |
| 7,162,433 B1 * | 1/2007 | Foroutan | 705/11 |
| 7,292,990 B2 * | 11/2007 | Hughes | 705/7.14 |
| 7,536,315 B2 * | 5/2009 | Tsyganskiy et al. | 705/10 |
| 2001/0025296 A1 * | 9/2001 | Narang | 709/201 |
| 2002/0095305 A1 * | 7/2002 | Gakidis et al. | 705/1 |
| 2002/0198768 A1 * | 12/2002 | Huppenthal | 705/14 |
| 2003/0036947 A1 * | 2/2003 | Smith et al. | 705/10 |
| 2003/0060910 A1 * | 3/2003 | Williams et al. | 700/91 |
| 2003/0149681 A1 * | 8/2003 | Frees et al. | 707/1 |
| 2003/0164849 A1 * | 9/2003 | Barrie et al. | 345/733 |
| 2003/0227479 A1 * | 12/2003 | Mizrahi et al. | 345/753 |
| 2004/0172267 A1 * | 9/2004 | Patel et al. | 705/1 |
| 2004/0186738 A1 * | 9/2004 | Reisman | 705/1 |
| 2004/0204957 A1 * | 10/2004 | Afeyan et al. | 705/1 |
| 2009/0327051 A1 * | 12/2009 | Nerby | 705/11 |

OTHER PUBLICATIONS

"Automatic Categorization Tool for Organizing Brainstorming Comments", IBM Technical Disclosure Bulletin, vol. 41, No. 1, Jan. 1998, pp. 207-209.
Written Opinion in PCT/BE2004/000136, issued Jan. 28, 2005.

* cited by examiner

*Primary Examiner* — Faruk Hamza
*Assistant Examiner* — Shirley Zhang
(74) *Attorney, Agent, or Firm* — Bacon & Thomas, PLLC

(57) ABSTRACT

The techniques of the present invention provide mechanisms for enabling a new type of interactive online discussion where any number of people can participate in a discussion of a topic and having the impression of following a coherent discussion. By following a novel process described in the present invention, eventually they would collectively generate a set of statements that the majority of the participants have agreed to. Moreover, a participation performance of the participants is being kept so as to potentially regroup those best performers in a future meeting with a similar topic.

31 Claims, 9 Drawing Sheets

Process 2:
User *u* sends statement *Mu*

Broadcast message *Mu* from User *u* in slot *Su* to other users occupying slots in *neighbours(Su)*.

Add message *Mu* to the list *messageList(Su)* and to all the lists *messageList($S_i$)* for slots *i* neighbours of slot $S_u$

METHOD AND APPARATUS FOR SCALABLE MEETINGS IN A DISCUSSION SYNTHESIS ENVIRONMENT

FIELD OF THE INVENTION

The present invention relates to methods, apparatus and network elements for coordinating, conducting and/or controlling online or offline meetings and coordinating or controlling online or offline problem solving among a plurality of participants using a communications network, e.g. a computer network environment. The present invention also relates to methods, apparatus and network elements for instant messaging, chatting, teleconferencing, web-conferencing, e-learning, etc.

BACKGROUND OF THE INVENTION

People in organizations spend an inordinate amount of time organizing and participating in meetings. These meetings have various purposes among them are status updates, problem solving, planning, brainstorming, training, decision-making, etc. The range of meetings varies from a one-to-many meeting, such as conferences and presentations, to many-to-many meetings, e.g. frequently horizontal discussions with a majority of peers among the participants, which are common among smaller divisions in an organization to informal meetings of a few people such as the ones happening when somebody drops by the office.

As these organizations move towards being more distributed over a wider geographical area, setting up and participating in these meetings takes more resources and time. Moreover, given that the participants are usually not co-located, feedback and follow-on next steps are more difficult to arrange because it is difficult to organize smaller, informal meetings to get to these next steps completed. The end result is that it requires more work from the part of the participants to get to tangible results of a meeting. Still, these meetings are considered to be the most efficient way to coordinate and get things done within organizations.

With the advent of wide area networks such as the Internet, organizations have come to adopt new technologies such as instant messaging, chatting, tele-conferencing, web-conferencing, e-learning, etc. in order to alleviate the problem of getting people to work together and of disseminating information to the right people despite them being in disparate locations. Even though online (or even offline) discussions might have a potential of breaking down the limitations of space, they are usually seen as a second best solution. The lack of richness and expressiveness in online discussions is seen as a handicap in facilitating communication between the different parties. There is a continuing effort to resolve this problem, but still, face-to-face meetings are seen as the most efficient way to resolve problems and plan work at hand in an organization.

Yet, face-to-face meetings have many problems. Some of them are associated with inherent personal social contracts in organizations between the participants. Contradicting the "boss" in some circles might be seen as a breach of protocol or a CLE (Carrier Limiting Event). Cooperating with other co-workers knowing that you are competing for the same resources and potentially the same job may become a hindrance to carrying out efficient meetings. Having a productive discussion with more than 15 people becomes a challenge in itself. Getting an honest and impartial synthesis of the ideas and conclusions discussed in a meeting is hard to come by especially as the number of participants grow. Putting together those people who would be most relevant for the meeting becomes an issue specially if the organizer is not familiar with the participants. Online meetings have not solved any of these issues. Current online messaging technologies have mostly been oriented towards resolving the issue of meeting people in distributed locations.

Against this backdrop, it will be appreciated that there exists an ongoing desire to improve the process by which participants meet and come up with tangible results that take into account the collective knowledge and the consensus of everyone involved.

SUMMARY OF THE INVENTION

An object of the present invention is the provision of methods and apparatus for organizing participants in an online or offline discussion so as to make the process of problem solving and synthesis of the discussion more efficient. The present invention can be used for instant messaging, chatting, teleconferencing, web-conferencing, e-learning, etc. The purpose of the discussion can be very varied, e.g. to obtain a decision on a topic, to design a logo, to design a chemical compound, e.g. a pharmaceutical based on a lead compound, to design an electrical circuit, to create a jingle or other form of music, to design software code, to generate the lines of a play, to create the lines of a book, to decide on a trademark, to decide on a company organisation, to decide on a marketing strategy, etc.

The present invention provides in one aspect a communications network based system for providing mechanisms for enabling a discussion about a chosen topic, wherein a group of a plurality of participants participate in the group, the system comprising:

means for contributing a statement on a topic, means for allowing this statement to be sent to an initial subset of the participants, each participant of the group being provided with means to rate a statement by assigning a value or code to that statement, a controlling mechanism for controlling whether a statement of a participant on said topic is propagated to an ever increasing number of the rest of the participants according to a first criterion that depends upon the values or codes assigned to the statement by the participants to whom the statement has been sent, means to determine the extent the statement has propagated through the group, and means to determine that at least one statement has been collectively selected, whereby determining selection of the at least one statement depends on the extent the at least one statement has propagated through the group. The control mechanism can have:

means to group the participants in initial subsets, means to allow each member of an initial subset to receive statements submitted for the first time by only a member of that initial subset, means for selecting the initial subsets such that there are at least two subsets whose member participants differ by less than 5 participants, preferably less than 3 participants, more preferably less than 2 participants and most preferably less than one participant.

The means for selecting the initial subsets preferably selects the subsets such that for each first initial subset there is at least one other subset whose member participants differ from the first initial subset by less than 5 participants, preferably less than 3 participants, more preferably less than 2 participants and most preferably less than one participant. The means for selecting the initial subsets preferably selects the subsets such that if a first participant can receive a statement from a second participant, the second participant can receive a statement from the first participant.

The means for assigning of a code or value to a statement preferably includes means for assigning one of two or more codes or for assigning one of a plurality of values between two extreme values.

The control mechanism preferably controls further propagation of a statement depends upon a second criterion. The control mechanism preferably also has means for determining the fraction of the initial subset that have assigned a value or code to the relevant statement and the second criterion is related to the fraction of the initial subset that have assigned a value or code to the relevant statement.

The network may have means for storing addresses of participants in a communications network for the network based discussion, the control mechanism organising the addresses in a logical ring.

The control mechanism preferably associates each address of a participant to a slot in the logical ring and the initial subset to which a participant belongs is selected as being plus/minus a certain number to slots starting from the slot assigned to the participant.

The network preferably includes means for determining whether a participant is still actively present in the group. The network preferably comprises means for rating a participant depending upon statements submitted by the participant to the discussion. The means for rating a participant preferably rates a participant based on the success of statements made by the participant being propagated to the rest of the group.

The control mechanism may determine a rate at which statements are propagated to the ever increasing number of the rest of the participants to be arithmetically or algebraically or geometrically or exponentially increasing.

In another aspect the present invention provides a method for providing mechanisms for enabling a network based discussion about a chosen topic, wherein a group of a plurality of participants participate in a group discussion, participants being provided with means for contributing a statement on a topic and means for allowing this statement to be sent to an initial subset of the participants, each participant of the group being provided with means to rate a statement by assigning a value or code to that statement, wherein a statement of a participant on said topic is propagated to an ever increasing number of the rest of the participants according to a first criterion that depends upon the values or codes assigned to the statement by the participants to whom the statement has been sent, to thereby collectively select at least one statement, whereby selection of the at least one statement depends on the extent the at least one statement has propagated through the group. In the method, the group of participants can be grouped in initial subsets, each member of an initial subset receiving statements submitted for the first time by only a member of that initial subset, further comprising the step of selecting the initial subsets such that there are at least two subsets whose member participants differ by less than 5 participants, preferably less than 3 participants, more preferably less than 2 participants and most preferably less than one participant.

The initial subset selecting step can be such that for each first initial subset there is at least one other subset whose member participants differ from the first initial subset by less than 5 participants, preferably less than 3 participants, more preferably less than 2 participants and most preferably less than one participant. The group of participants can be grouped in initial subsets and selection of initial subsets is such that if a first participant can receive a statement from a second participant, the second participant can receive a statement from the first participant.

The assigning of a code or value to a statement can include assigning one of two or more codes. Assigning of a code or value to a statement can include assigning one of a plurality of values between two extreme values.

In the method further propagation of a statement can depend upon a second criterion. The second criterion can be related to the fraction of the initial subset that have assigned a value or code to the relevant statement.

Addresses of participants in a communications network for the network based discussion are preferably organised in a logical ring. Each address of a participant can be assigned a slot in the logical ring and the initial subset to which a participant belongs is selected as being plus/minus a certain number to slots starting from the slot assigned to the participant.

The method can also comprise determining whether a participant is still actively present in the group. It can include rating a participant depending upon statements submitted by the participant to the discussion. It can also include rating of a participant being based on the success of statements made by the participant propagating to the rest of the group.

In the method the rate at which statements are propagated to the ever increasing number of the rest of the participants can be arithmetically or algebraically or geometrically or exponentially increasing.

In yet a further aspect of the present invention a network element is provided for use in a communications network providing mechanisms for enabling a discussion about a chosen topic, wherein a group of a plurality of participants participate in the group using terminals in communication with the network, the network element comprising:

means for receiving a statement on a topic from a participant terminal, means for sending this statement to an initial subset of the participant terminals, means for receiving from a participant terminal a value or code rating a statement, a controlling mechanism for controlling whether a statement of a participant on said topic is propagated to an ever increasing number of the rest of the participants according to a first criterion that depends upon the values or codes assigned to the statement by the participants to whom the statement has been sent, means to determine the extent the statement has propagated through the group, and means to determine that at least one statement has been collectively selected, whereby determining selection of the at least one statement depends on the extent the at least one statement has propagated through the group. The network element can be a server in a server-client architecture. It can be programmed to carry out any of the functions of the control mechanism.

In yet a further aspect of the present invention a software computer product is provided for carrying out any of the methods of the present invention. The computer program product can be stored on a machine readable data carrier such as a diskette, a tape, an optical disk such as a CD-ROM or DVD-ROM, a hard disk, solid state memory, etc. These and other features and advantages of the present invention will be presented in more detail in the following specification of the invention and the accompanying figures that illustrate by way of example the principles of the invention.

BRIEF DESCRIPTION OF THE DRAWINGS

The present invention will be readily understood by the following detailed description in conjunction with the accompanying drawings, wherein like reference numerals designate similar structural elements, and in which.

DETAILED DESCRIPTION OF THE PREFERRED EMBODIMENTS

Figure 1:
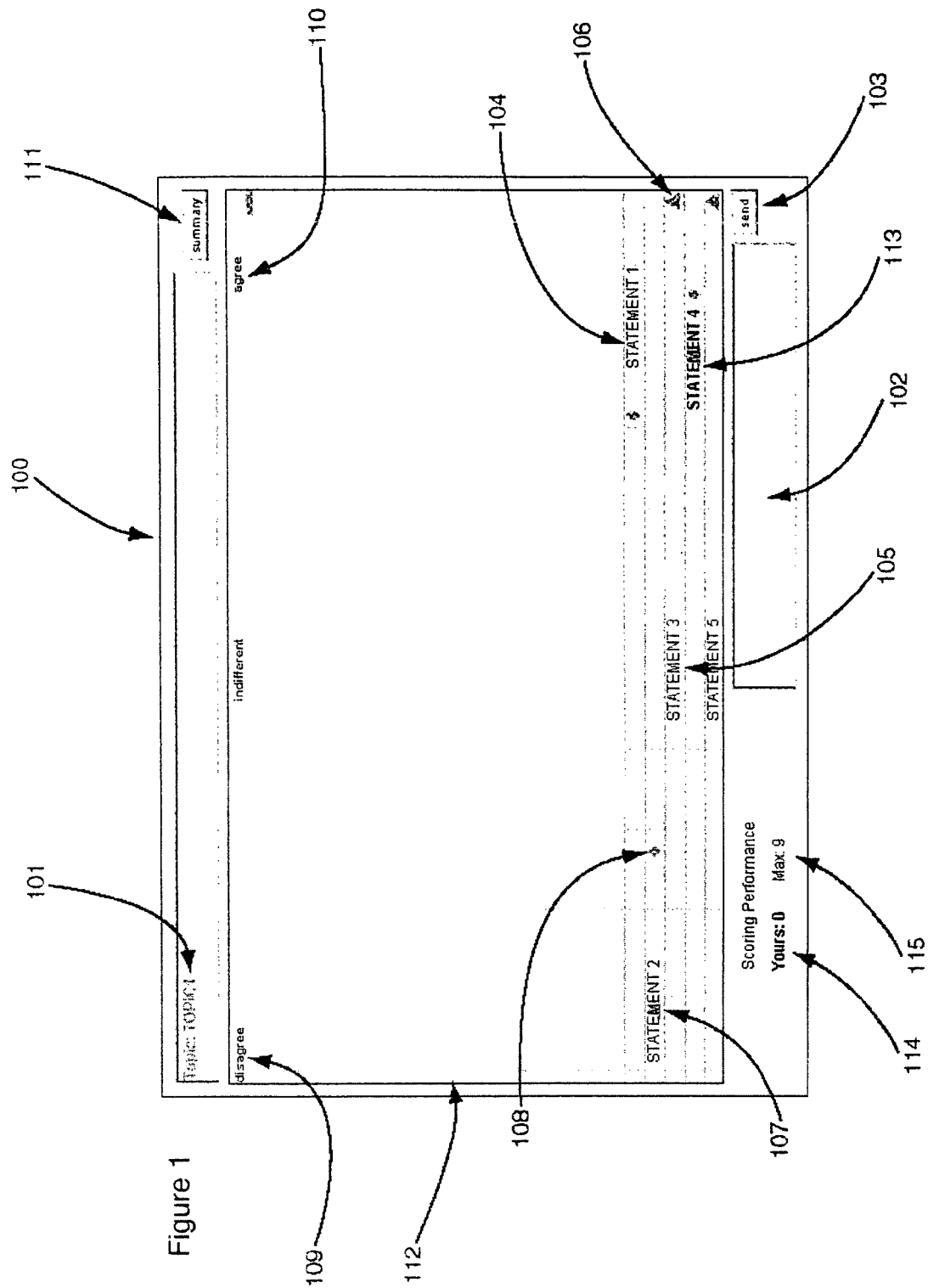
FIG. 1 depicts an example of a graphical user interface showing a discussion of a participant that has been implemented in accordance with an embodiment of the present invention.

Reference will now be made in detail to some specific embodiments of the invention. Examples of these specific embodiments are illustrated in the accompanying drawings. While the invention will be described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In one aspect the present invention provides a method and system for providing mechanisms for enabling a new type of interactive online discussion about a chosen topic, wherein any number of people can participate in said discussion, contributing their opinions or statements initially to a subset of participants and yet collectively forming a coherent global discussion that includes the opinions of whole group, wherein the opinions of said participants about said topic propagate to the rest of the discussion according a schedule that depends on the degree of agreement among the participants that have seen said opinions wherein a summary of said discussion emerges that includes those opinions that have the widest support from the whole group, wherein a rating of said participants is calculated depending on their contribution to the discussion and the success of their opinions propagating to the rest of the group.

The techniques of the present invention can provide mechanisms for enabling a new type of interactive online or offline discussion where any number of people can participate in a discussion of a topic while having the impression of following a coherent discussion. By following a process described in more detail below, eventually the participants would collectively generate a set of statements to which the majority of the participants have agreed.

Additional features of the present invention include a participation performance of the participants being kept. The participation performance can be used for a variety of uses, e.g. to potentially regroup those best performers in a future meeting with a similar topic, to eliminate some participants, to propagate the submissions from some participants more quickly, etc.

In one aspect of the present invention, participants send messages much like current instant messaging and chat systems. However, a message is not broadcasted initially to everyone in the discussion, but first to a selected few neighbours. In addition, participants that view this message from another participant get to assign a value or code to the message, i.e. to score or rate it according to a standard or protocol, e.g. the degree of agreement or disagreement with what is presented by the other participant. Depending on the responses from this selected first set of participants and the accumulated score for the message, e.g. the degree of agreement within this initial set of participants, this message is broadcasted again to a wider set of participants who in turn would rate it. Based on the accumulated score at this point the message would be again broadcast to a large audience or not propagated. The process is repeated to an ever increasing number of the participants until there is either a propagation stopping event, e.g. the aggregate score for a message falls below a threshold or an absolute veto is injected by a participant, or e.g. the aggregate score for a message rises above a threshold so that the message is considered to be collectively acceptable, or the message propagation halts because the message reaches a predefined percentage of the group or the whole group of participants. At the end of the session, participants would get a list of those messages that have had the most agreement among the group. This list is, in a sense, a very good start for a synthesis of the meeting and the best consensus from the participants of the resulting outcome of the meeting. Optionally, those participants that generated the messages with the widest agreement get higher performance scores. Optionally, these scores may be kept for future use by meeting organizers to select the most appropriate group to discuss a similar topic.

The scenario described above which uses techniques and apparatus provided by the present invention, illustrates a number of advantages over conventional techniques for carrying out an online or offline meeting. The technique is scalable—in accordance with techniques described herein, the number of participants in a meeting can well be in the thousands. Considering that they are many-to-many meetings, they are more performant than anything possible either online or face-to-face. However, even with these many participants, every participant has a coherent discussion with a small group participants because they would be discussing mostly with their neighbours and also a reduced by coherent discussion with other participants as every so often they will see statements from other more distant neighbours. In this way, while having a local discussion they also participate in the global debate either gathering hints from other distant neighbours or casting their statements or opinions to other participants' ideas. It is in this sense, that the discussion is scalable because a global discussion is happening while every participant is also having a local one.

As described in greater detail below, not only every participant has a sense of a coherent local discussion but the discussion itself is globally coherent and has a continuous flow. In one aspect of the present invention every participant gets to see mostly local messages coming from their neighbours and the discussion that every participant is having can be unique and different from each other. However, as described in the techniques of the present invention, each participant discussion has a strong overlap to the discussion of their neighbours and by this property the global discussion gets common continuity.

In the present invention, some of the disadvantages seen in online discussions, e.g. simple text, lack of richness in expression, etc., are turned into advantages. Indeed, in one aspect of the present invention, a simple text discussion is coupled with the possibility of being relatively anonymous for a participant. This allows for the discussion to do away with personality conflicts, power struggles, politics, etc. and to increase the chance that an idea would be considered for its merit and not by the characteristics of who came up with it.

TABLE 1 shows a table where the first column is the level of propagation for a message, the second column is the number of neighbours for the corresponding level and column 3 the fraction of neighbours for the corresponding level that have scored above the threshold after which the message is promoted to the next level of propagation in accordance with an embodiment of the present invention.

| Level | qThreshold | qTotal |
|---|---|---|
| 0 | 1 | 1 |
| 1 | 2 | 2 |
| 2 | 3 | 4 |
| 3 | 4 | 6 |
| 4 | 9 | 12 |
| 5 | 15 | 24 |
| 6 | 30 | 48 |
| 7 | 70 | 96 |
| 8 | 153 | 192 |
| 9 | 307 | 384 |
| 10 | 614 | 768 |
| 11 | 1228 | 1536 |
| >12 | $0.8*3*2^{level-2}$ | $3*2^{level-2}$ |

Form of the Communications Network

The form of the communications network is not considered a limitation on the present invention, e.g. Local Area Network (LAN), Personal Area Network (PAN), Wide Area Network (WAN), Metropolitan Area Network MAN), Wireless Network or Fixed cable network, satellite network, Intranet or Internet, peer-to-peer network, etc. Generally, messages will be routed around the network in a digital form.

A network which can be used with the present invention for any of its embodiments will contain participant terminals. Each participant terminal will generally be a computing device comprising one or more processing engines, e.g. including a microprocessor as well as memory storage means, a display unit and a means to connect to the network for digital transmission and reception, e.g. a network card, a modem etc. Each terminal will generally include data input means and memory for storing any data input as well as any data received from other network elements. Each terminal may be as described with reference to FIG. 5 and its explanation below.

The network may include one or more servers. Each server will generally be a computing device comprising one or more processing engines, e.g. including a microprocessor, as well as memory storage means, a display unit and a means to connect to the network for digital transmission and reception, e.g. a network card, a modem etc. Each server will generally include data input means and memory for storing any data input as well as any data received from other network elements. Each server may be as described with reference to FIG. 5 and its explanation below.

The network can be server centric. In this case a central server communicates online or less preferably offline with a plurality of participant terminals in a client-server communication relationship and architecture. The server comprises means, e.g. software running on a processing engine to present a graphical interface, e.g. a browser interface, to each participant. Also the server has means to present on this interface the statements relevant to each client terminal and to track and record and store in memory responses from the participants. Each server can include output means for displaying participant contributions to one or more other network elements such as other server or participant terminals. Each server can include output means for displaying participant contributions to an initial subset of the participant terminals. Each server can include output means for displaying participant contributions to one or more other network elements such as other server or participant terminals without any of the participants being aware of the identity or network address of any of the other participants. Each server can include output means for displaying participant contributions to one or more other network elements such as other server or participant terminals in an encrypted form or over a secure or protected line or connection, e.g. via an SSL or HTTS connection.

The server also has means to process the scores, e.g. codes or values, sent by the participants in accordance with a protocol to decide which statements (called "synthetrons") are to be propagated to a wider audience. It also has means to send such accepted statements to this wider group of participants and collect and process and store responses from this wider audience. The server has means to identify a message which has reached a certain level of accumulated scores and to send this message to the participants as a final accepted message or final collective "synthetron". The server may also have means to log which messages are proposed from which participant and keep a tally of the success rates of contributions from one participant and to store these in memory.

Alternatively, the network may be a multiserver network. Various multiserver implementations are included within the scope of the present invention. For example, each server of a number of servers may carry out the server functions mentioned above for a limited number of participants. Once a statement has passed the scrutiny of the local group such an accepted statement is then sent to another or all of the other servers and the propagation is then organised by this or these servers to their groups or groups of participants.

It is not necessary in accordance with the present invention that all the servers in a multiserver implementation carry out the same functions. An alternative multiserver network is described in more detail with respect to FIG. 5, which there are two servers which perform different functions.

Alternatively, or additionally the network may also have some distributed capability. For example the clients terminals may have means, e.g. software running on a suitable processing engine, to communicate statements locally to the members of the first limited set of neighbours. Once a statement has passed this local scrutiny it may be passed to a server for further propagation to a wider audience under the control of the server or servers.

The network may also contain no server, e.g. it may be a peer-to-peer network. In this case each terminal in the peer-to-peer network has means, e.g. software running on a processing engine to coordinate messages sent to and received from certain neighbours as well as means to propagate statements which have received a sufficient local score to be propagated and also means to propagate statements which it receives from other terminals and which have passed the local scrutiny in another neighbour group than the one in which the terminal is located. Such a participant terminal can comprise means, e.g. software running on a processing engine to present a graphical interface, e.g. a browser interface, to itself and to any other participant. Also the terminals can have a means to present on this interface the statements relevant to each this terminal and to track and record and store in memory responses from the other participants. The terminals can include output means for displaying participant contributions to one or more other network elements such as other participant terminals. Each terminal can include output means for displaying participant contributions to an initial subset of the participant terminals. The terminals can include output means for displaying participant contributions to one or more other network elements such as other participant terminals without any of the participants being aware of the identity or network address of any of the other participants. The terminals can include output means for displaying participant contributions to one or more other network elements such as other participant terminals in an encrypted form or over a secure or protected line or connection, e.g. via an SSL or HTTS connection.

The terminals may have means to process the scores, e.g. codes or values, sent by the participants in accordance with a protocol to decide which statements (called "synthetrons") are to be propagated to a wider audience. It also has means to send such accepted statements to this wider group of participants and collect and process and store responses from this wider audience. The terminals can have means to identify a statement which has reached a certain level of accumulated scores and to send this message to the participants as a final accepted message or final collective "synthetron". The terminals may also have means to log which messages are proposed from at least one participant and to keep a tally of the success rates of contributions from the one participant and to store these in memory.

In the following representative embodiments will be described sufficient for the skilled person to apply the same methods to other network topologies.

Statements and Neighbours

For the purposes of this application, messages entered, e.g. typed, drawn uploaded, by participants will be referred to as "statements". These statements may be any suitable message, e.g. an opinion or suggestion in text form, a piece of software code to be reviewed and tested, a design of a product presented in the form of a drawing, a chemical formula which to be modified, a melody or jingle either entered in a form so that it can play automatically in multimedia environment or merely as a graphical representation of musical notes, etc. In the following description reference will generally be made to "typed" messages or statements. It is to be understood that any type of input which can be sent around a communications network, e.g. in digital form, can be used in any of the embodiments of the present invention.

The term "neighbours" refers to other participants in the logical vicinity of the participant who generated the statement. "Logical vicinity" refers to the fact that certain participant addresses (of a reduced set compared with the total group) can be derived from the participant address of the participant sending the message, e.g. a set of addresses can be stored as neighbour addresses for each participant, or an algorithm may be applied to the first participant address to determine the neighbour addresses, etc. Logical vicinity does not necessarily imply physical vicinity. Using a telecommunications network such as the Internet renders the concept of physical vicinity redundant. Where the participants are organised in a logical ring, vicinity can be related to the slot location in the ring as further described in the paragraphs below and in accordance to a specific embodiment of the present invention.

The term ring relates to a virtual or address-space organisation of the participants addresses. It does not relate to a physical ring. In the following embodiments reference will be made to ring which is a one-dimensional line joined at its ends. However, the present invention is not limited to a ring. A ring is useful when forming neighbour groups in that addresses of participants at the end of a line wrap around to the other end of the line is a virtual ring. However, this advantageous property of a ring is not essential for the invention. All that is required is that neighbour groups can be defined and a propagation schedule can be devised which propagates statements to members of the group so that each participant scores a statement only once. Where the network is constructed logically in a multi-dimensional array, e.g. in a wireless peer-to-peer network, it is only necessary to decide on an algorithm of how to determine a neighbour and how to propagate. If the network can be reduced to a Cartesian array or other form of regular array, then this array can be scanned without duplication of nodes by a variety of known scanning algorithms, e.g. raster scanning, or Peano curves or Hilbert random walks. These curves are known as space-filling curves and can be extended to any number of dimensions. Hence a network of arbitrary number of dimension can be reduced by means of a space filing curve into a one dimensional list of non-duplicated participant addresses. The line may then be joined logically into a ring, if desired.

First Embodiment

User Interface Elements

FIG. 1 shows an example of a graphical user interface 100 where a participant 15 is engaged in a discussion of topic TOPIC that has been implemented in accordance with a specific embodiment of the present invention. Window field 101 shows the current topic being discussed and in the field 102 the participant can input a statement, for example type an opinion or message on a keyboard, draw a figure using a pointing device such as a mouse and a graphics software program, or enter a melody in the form of notes, etc. The participant then activates a send of the contribution, e.g. by activating the "send" button 103 which will, in turn, broadcast the statement to a set of neighbours of the participant viewing user interface 100. Instead of activating a button any other form of activation may be used, e.g. pressing "enter", using a mouse click, dragging an icon to a drag and drop target, etc. As indicated above the neighbour set is a reduced set compared to the whole group of participants.

The window may be, for example, a browser window. The window is displayed on any suitable display device, e.g. a display unit of a laptop, computer, mobile phone, smartphone, PDA, etc. The window may be generated by software running on the terminal being viewed by the participant of more displayed from a server, e.g. as an HTML document. As indicated above the present application includes within its scope a wide variety of methods of sending such statements around a network, e.g. in a server-client network, a distributed network or a hybrid of the two.

Window field 112 shows the list of statements sent and received by the participant. Statement 104 corresponds to a statement that the participant typed and which has been broadcasted to his/her neighbours. Statement 105 is a statement that has been received by the participant and sent by a neighbour participant. A means for inputting a score is provided which allows the participant to assign a value or code to the statement 105. The value may be any type of value, e.g. an alphanumeric value. The code may be any suitable code for assigning a statement to a category or class of statements. The score may be a simple binary yes/no or agree/disagree or it may include any number of gradations, e.g. love/agree/disagree/hate. For example, a slider control 106 may be provided which allows the participant to score statement 105 according to the degree of agreement with what is being said by it. For example, sliding the control 106 to the side of the "disagree" label 109 would mean that the participant does not agree with what is being said in the statement. Sliding control 106 to the opposite direction towards the "agree" label 110 would mean that the participant agrees with what is being said in the statement. 107 shows a statement scored with a "disagree" score. Means may also be provided for displaying the group status on any statement. For example, slider indicator 108 shows within the agree-disagree scale, where the group stands. Notice that statement 104 does not have a sliding control to score the statement so that the participant is not able to rate his/her own statement.

Figure 2:
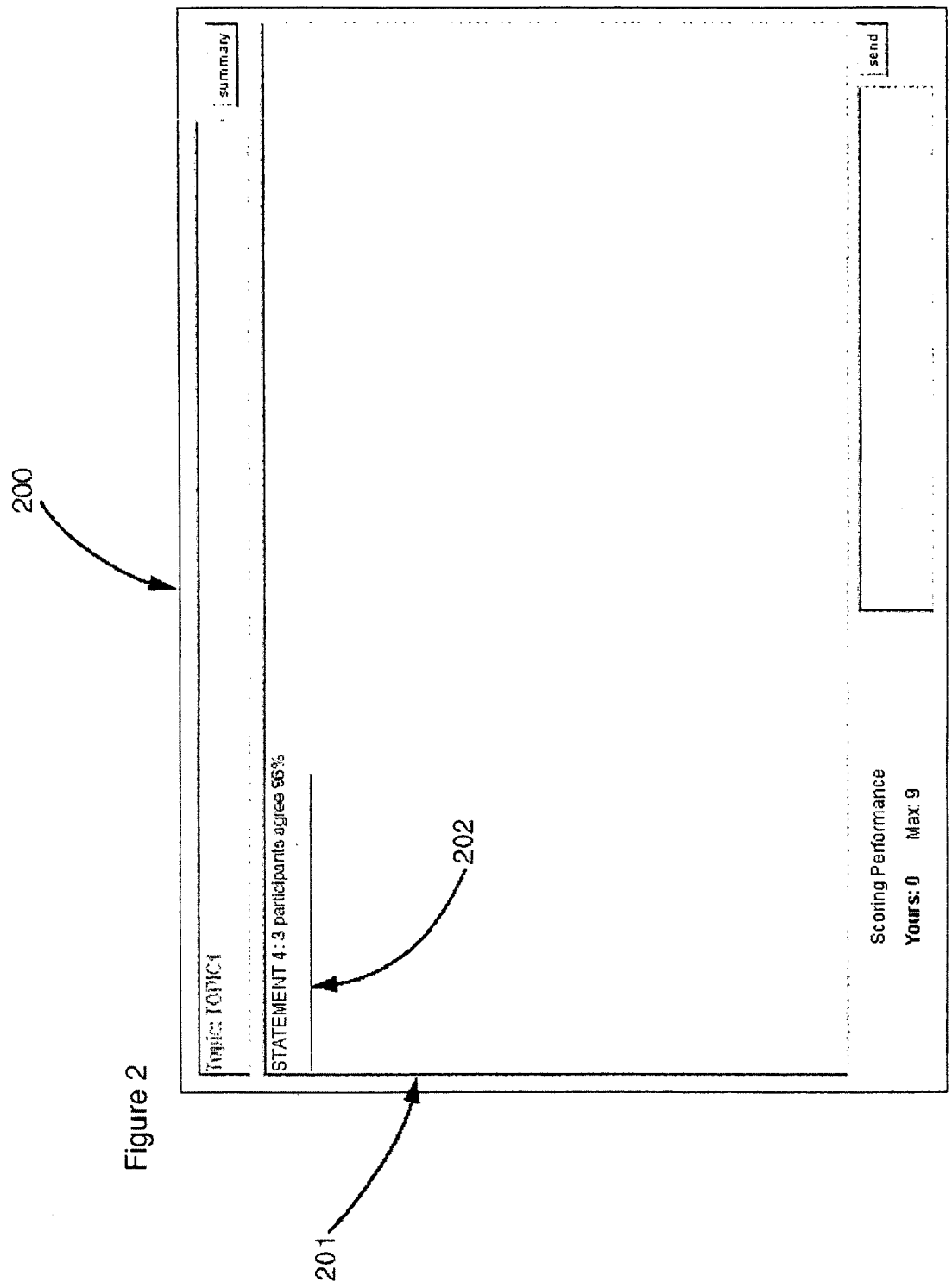
FIG. 2 depicts an interaction step of the graphical user interface from example depicted in FIG. 1.

Optionally, statement 113 turns bold or is highlighted in another way when it has achieved a certain score value collectively within the group. The collective score value may be rated for further propagation of the statement by means of a protocol, e.g. whether it has achieved a sufficient collective score acceptance, i.e. in accordance with a certain criterion. Various schemes are included within the scope of the present invention for the protocol which determines whether a message has achieved a score which means it is to be propagated. A simple algorithm is that most of the neighbours either strongly agree or strongly disagree with it or that a combined score exceeds a certain value. More complex algorithms are included within the scope of the invention, e.g. that some or each participant also has a veto right—invocation of this right "kills" a statement and prevents propagation. An example would be one or more participants with moderator capabilities who remove statements which are unacceptable, e.g. illegal, for example contrary to anti-trust law, offensive, or totally irrelevant to the discussion. Another possibility is to propagate statements which invoke extreme positive and negative opinions, i.e. that the opinions of the group are split between either strongly for or against. Statements which invoke this response can be of importance. For the purposes of this application, any statement suitable for propagation in accordance with the scoring protocol applied to the neighbour group ratings, e.g. that neighbours strongly agree or strongly disagree about, is referred to as a "synthetron". Once a statement becomes a synthetron, then it will be rebroadcast to a larger set of neighbours as described below, e.g. according to a specific embodiment of the present invention. Activating the "summary" button 111 changes the window field 112 to show the list of the synthetrons generated by the participant's local neighbourhood. FIG. 2 shows this step in the graphical user interface example of FIG. 1. In window field 201, statement 113 is listed as 202 indicating the number of participants that agree and the average percentage of agreement. Optional text label 114 shows the personal performance score of the participant which gets incremented as described below according to an embodiment of the present invention every time a participant's statement has been promoted to be a synthetron. Optional text label 115 shows the maximum performance score among all the participants of the discussion.

It should be noted that in other embodiments of the present invention, the user interface elements described above could have other form and layout but result in the same function according to the techniques described in the present invention.

Discussion Ring

Figure 3:
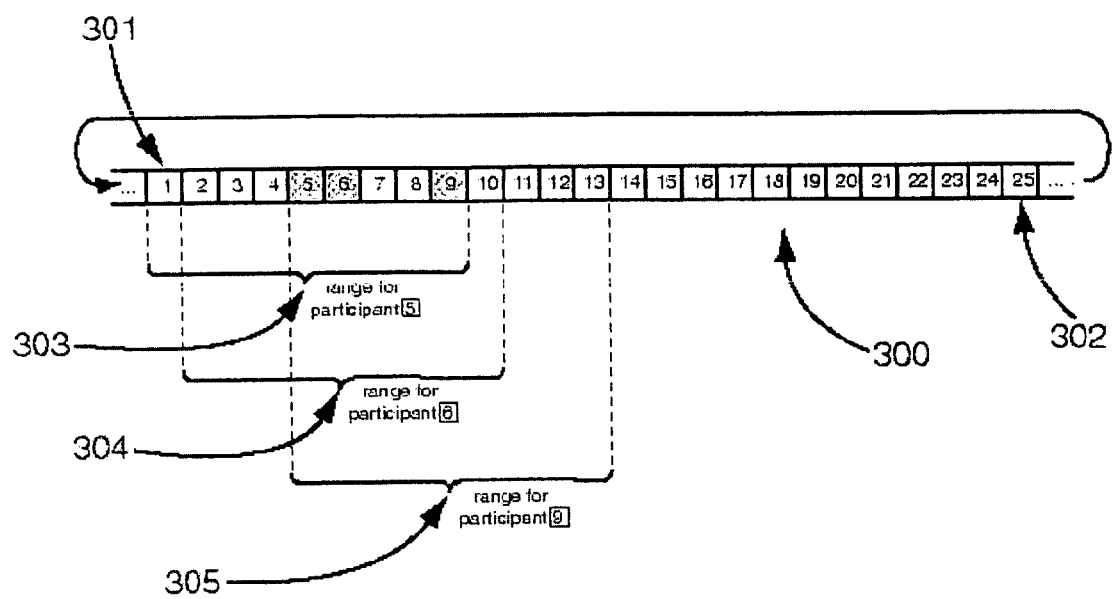
FIG. 3 shows a diagram of an array of slots organized as a ring which serves as a basic organization of the participants in accordance with an embodiment of the present invention.

When a participant joins a discussion, he/she gets presented with a graphical user interface on a terminal device, e.g. a computer, laptop, mobile phone, laptop, smartphone, PDA, etc. as shown in the specific embodiment of the example in FIG. 1. In accordance with one embodiment of the present invention the participant also gets assigned a slot in a discussion ring. It should be noted that the term "ring" need not have any physical significance. It refers to a way of organising communications with the participants, e.g. in the way participant addresses such as network addresses or email addresses are stored and used. The term "slot" therefore refers to an organisational or control element which identifies a participant to the system, e.g. a network address. FIG. 3 shows a diagram of the discussion ring 300 containing 25 participants. Every participant is assigned a slot in this ring. In the diagram of FIG. 3 the participants are represented by numbers between 1 and 25. Every participant has a range of neighbours, which in the specific embodiment shown in the diagram corresponds to 4 slots to the left and 4 slots to the right of the participant's slot. The extent of the range on either side of one participant which determines which participants are neighbours can be varied as desired. In FIG. 3, participant 5 has a range 303 corresponding to the slots of participant 1 to participant 9. The array of slots 300 is referred to as a "ring" because it wraps around logically. That is, the neighbour following participant 25 in slot 302 is participant 1 in slot 301 and vice versa and the slot 301 of participant 1 belongs to the range of neighbours 306 of participant 25. In this way, every participant has the same number of neighbours irrespective of the location of its slot in the ring and of the size of the ring. A ring organisation is not a requirement of the present invention. All that is needed is a way of defining a limited set of neighbours and a method for propagating messages to an ever increasing percentage of the group of participants.

The present invention includes a method of introducing new members to the discussion group or for members to leave. This is preferably done in such a way that the group discussion process can continue seamlessly. For example, a new participant joining the discussion gets inserted at a location in the ring, e.g. a random location, in a new slot and every slot to the right of the newly inserted slot gets pushed right by one location. If a participant leaves, then the slot of the leaving participant gets deleted and every participant's slot to the right of the one from the leaving participant get shifted one location to the left so that the ring has no holes.

Statements sent by a participant get broadcasted to its neighbours which are those participants with slots in the group of neighbours. One important property derived from this way of organizing the participant's conversation is that if participant A can see statements of participant B, then the reverse is also true. So for example, in the diagram of FIG. 3, participant 5 with range 303 has as one of its neighbours participant 9 and, conversely, participant 9 with range 305 has as its neighbour participant 5. So, statements from participant 5 would be seen by participant 9 and vice versa. Another important property of this set up is that even though every participant has a different and unique discussion, the discussions between participants with slots that follow each other overlap strongly. For example, in the diagram of FIG. 3, participant 5 with range of neighbours 303 has 8 neighbours in common with participant 6 with range 304. So, even though participant 5 would be seeing statements of participant 1 which would not be seen by participant 6, most of the statements seen by participant 5 would also be seen by participant 6. It is preferred if the discussions have a large overlap. Accordingly for any initial subgroup which is having an internal discussion it is preferred if there is at least one other subgroup whose membership differs from the former initial subgroup by less than a number, e.g. 10 or less, preferably 5 or less, more preferably 3 or less, most preferably only 1 member different. It is preferred if all of the initial subgroups have this property but there is still an advantage if only a certain percentage has this property, e.g. for 50% or more, 75% or more, 80% or more, 90% or more of the initial subgroups, there is at least one other subgroup whose membership differs by less than a number, e.g. 10 or less, preferably 5 or less, more preferably 3 or less, most preferably only 1 member different. With this property, the whole discussion gets a sense of continuity in that there is a lot of overlap between neighbouring participants and presumably they will get to follow a very similar discussion. By providing each participant with a different neighbour group and therefore a different discussion, but at the same time providing a lot of overlap, both continuity and variety are provided in controlled measures. Also, there is no problem adding as many participants as possible since this scheme allows for any number of participants.

Although it is preferred if the neighbour groups are selected as described above, other methods of selecting neighbour groups are included within the scope of the present invention, even if less preferred. For example, neighbour groups could be formed by a range of network addresses. A disadvantage of having groups with "hard boundaries" is that the number of participants in each group may drop below a minimum.

Topic Focusing

Figure 4:
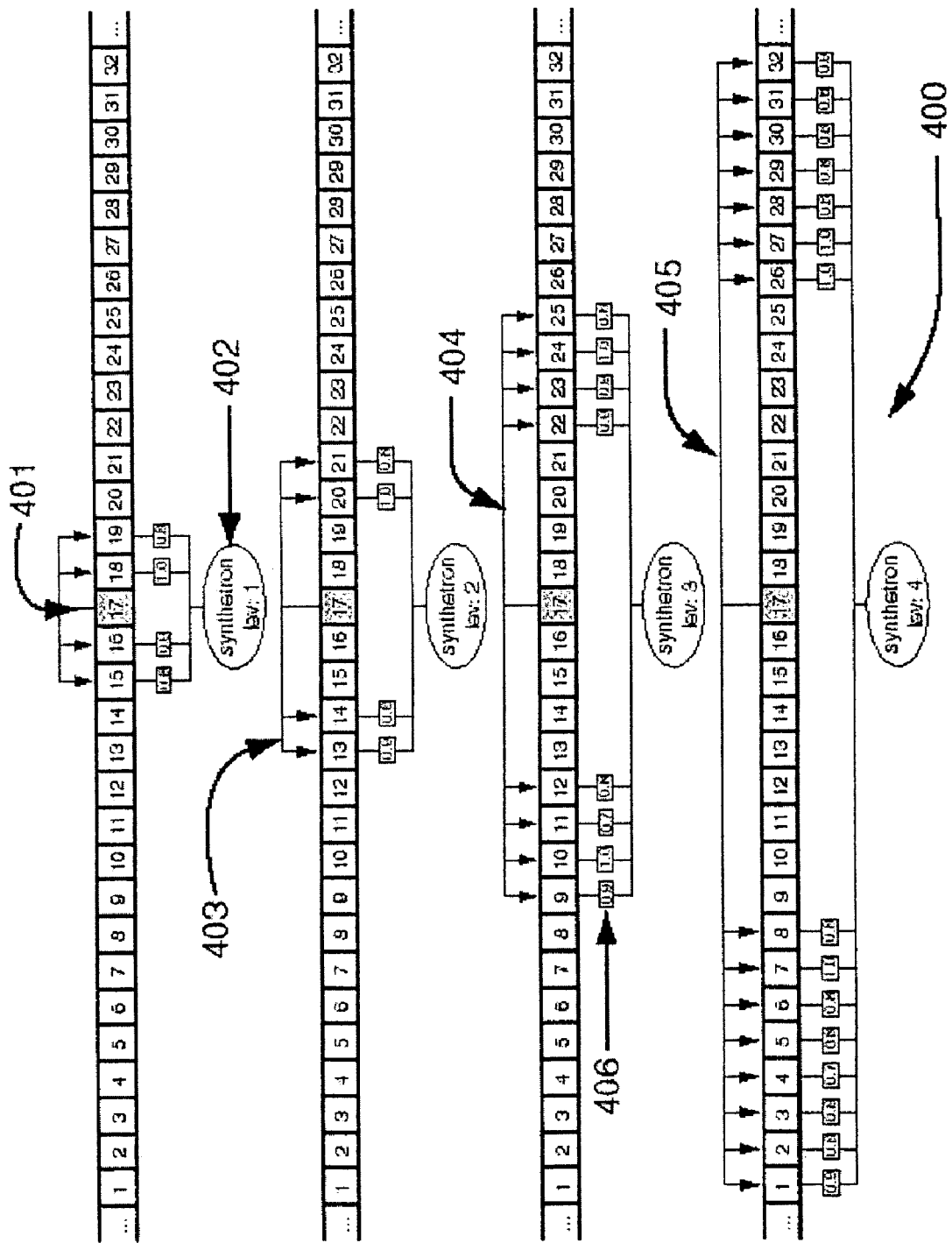
FIG. 4 shows in a diagram a sequence of steps for a message as it goes through different levels of propagation within the ring of participants implemented according to an embodiment of the present invention.

When a participant's statement gets broadcasted to its neighbours, these neighbours get to assign a value or code to the statement, e.g. to rate it according to the degree of their agreement to what is being said in it. As indicated above, a protocol is used to decide whether the statement has been rated by the group as suitable for propagation or not, e.g. if the statement average rating is above a certain threshold, it means that there is enough agreement among the local neighbours to propagate it further to more distant neighbours. As specified above, for the purposes of this application, this type of statement is called a "synthetron". FIG. 4 shows a diagram 400 of a sequence of propagation steps whereby a statement generated by participant 17 in slot 401 gets propagated 4 times so that it reaches an ever increasing percentage of the group. At every propagation step, the synthetron is said to have reached its next level. That is, the first time a statement becomes a synthetron it is said to be at level 1, which in FIG. 4 is shown as 402. If the average ratings after the next propagation step, which corresponds in FIG. 4 to 403, exceed a given threshold, then the statement is promoted to by a synthetron of level 2, shown in FIG. 4 as 404. The example in FIG. 4 shows a statement that has reached level 4. Notice in the diagram that every time a higher level is reached, the propagation not only reaches a larger total number of accumulated participants but it also the propagation happens at each higher level to a wider set of participants at that level. So, for example in diagram 400, in propagation step 403, the statement is sent to 4 participants. In propagation step 404, corresponding to a level 2, the statement is sent to 8 participants. In propagation step 405, the statement gets sent to 16 participants. This increase in numbers at each level is not necessary but it is useful. The present invention also includes propagation algorithms in which the same number of additional participants are contacted at each level, but this is less preferred. Hence, in preferred embodiments of the present invention a schedule of propagation steps is provided with which, with every additional level that a statement reaches, there is an ever-increasing accumulated number of participants to which a synthetron has been sent. In other embodiments of the present invention a schedule of propagation steps is provided with which at every level there is an ever-increasing number of participants to which a synthetron gets sent. In one embodiment of the present invention, the schedule follows an exponential increase of the number of participants that the statement is sent to at every level. Other propagation schemes may be used, e.g. based on arithmetic or algebraic analytical functions for deciding how many additional participants are included at each propagation level.

As described below, after a propagation step, the participants that have received the statement get to score it with a code or value, e.g. to rate it according to their degree of agreement with what is being said in it. In FIG. 4, those ratings are indicated with a number between 0 and 1 as shown in 406. However, the present invention includes other rating schemes, e.g. between −1 and +1, or a binary code such as yes/no or more complex codes such as love/agree/don't know/disagree/hate. As explained above, in order for the statement to be promoted to the next level synthetron, the average rating has to be above a given threshold. This scoring threshold may be the same for all levels the synthetron reaches or it may depend upon the level the synthetron has reached, e.g. it might stay the same, get easier or get harder with increasing level number to become a synthetron for the next level. In accordance with embodiments of the present invention passing the scoring threshold is a necessary condition, but not sufficient. In addition, the fraction of participants having rated the statement has to be also above a (different) given "presence" threshold. In other words the participants must contribute—there must be an active presence. This given presence threshold may be made dependent on or independent of the level reached by the synthetron. In one embodiment of the present invention, a schedule of thresholds is provided.

System Components and Characteristics

The characteristics of the components of the system, and the processes by which they operate in preferred embodiments of the invention are described below.

DEFINITIONS

Slots $S_i$ is the slot at location i from an array of slots, representing the ring, with indices in the range of [0, R−1].

R: size of ring messageList($S_i$): a list of messages sent by users occupying the associated slot S neighbours($S_i$, d): a set of slots that are in the range [−d, i+d]. If i−W is less than 0 then the range wraps to include slots in R−1, R−2, .... If i+d is greater or equal than R then the range wraps to include slots in 0, 1, ...

neighbours($S_i$)=neighbours($S_i$, W)

W: initial radius or range for the local discussion. In this embodiment it is set at 3, which means that every slot has 6 neighbours, 3 on either side $S_u$ is the slot associated with user u Messages $M_u$: message sent by user u.

Figure 7:
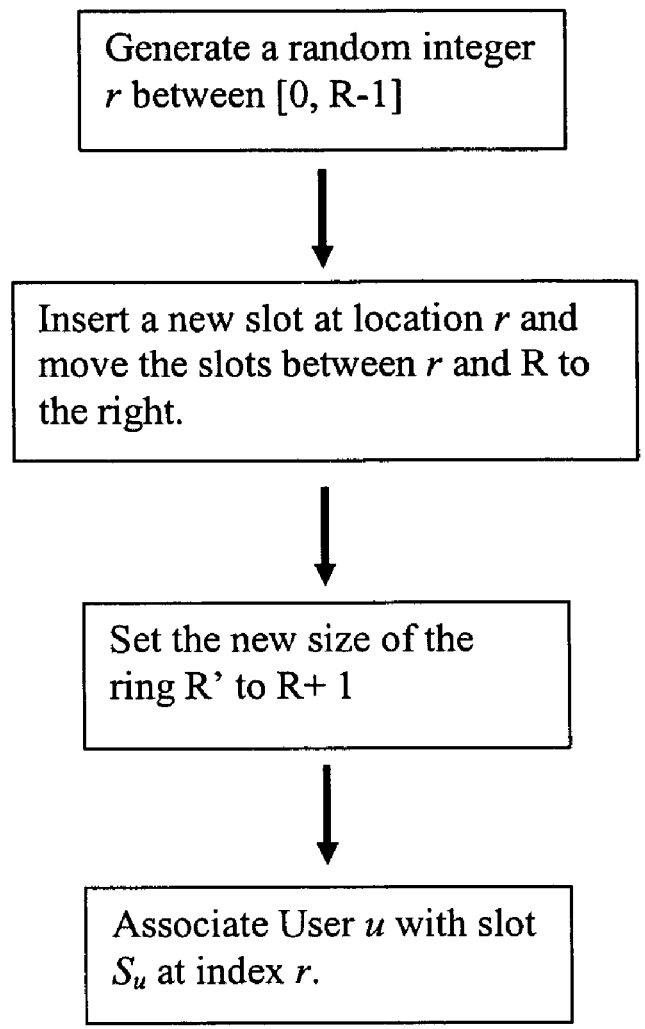
FIGS. 7 to 9 show process flows in accordance with an embodiment of the present invention.
Figure 8:
Figure 9:
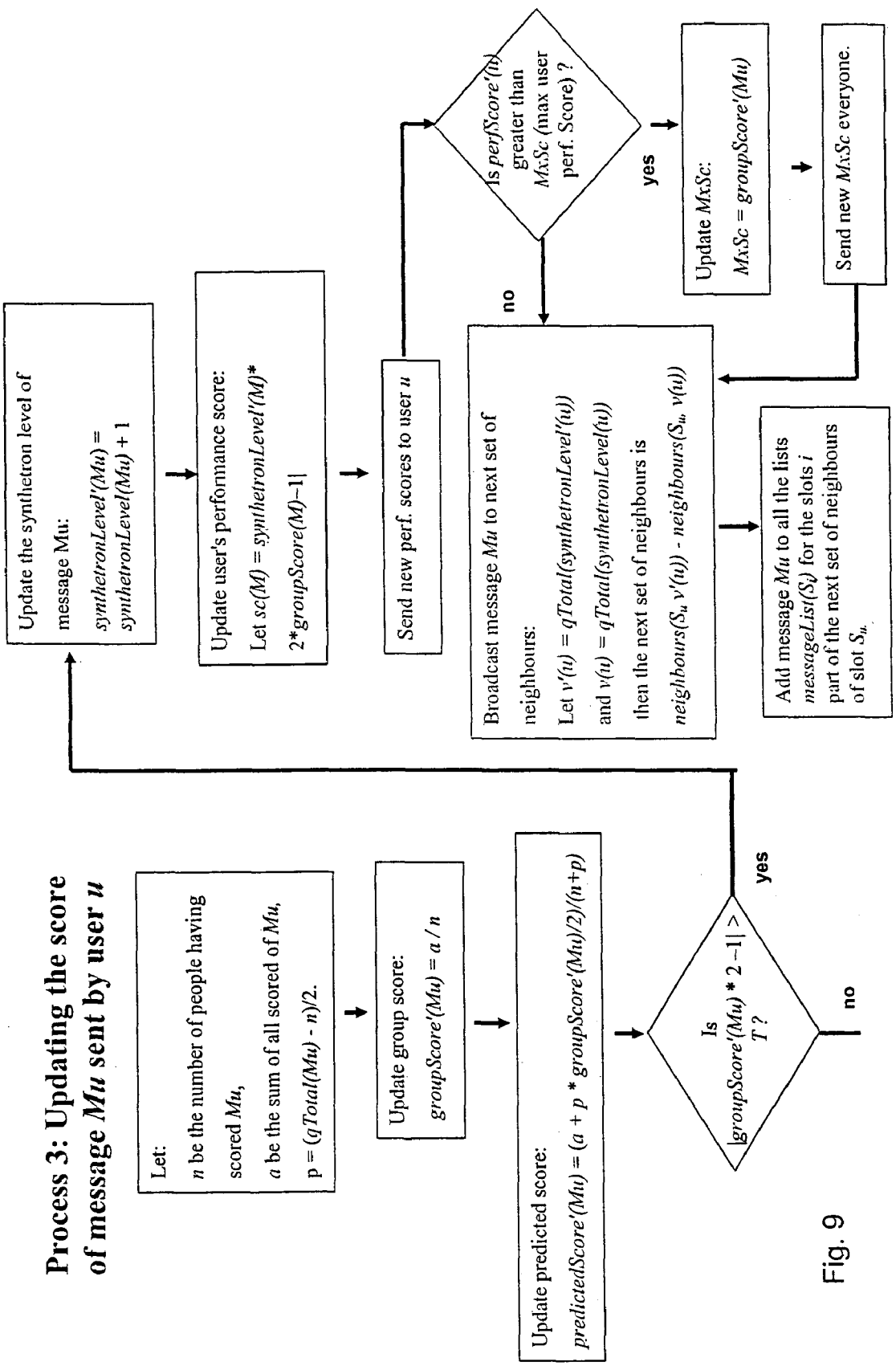

T: message score threshold after which the message is considered a synthetron, e.g. set to 0.8 groupScore(M): the averaged score that Users have given to message M, e.g. a value in the range [0.0, 1.0] or [−1.0, 1.0]

predictedScore(M): the prediction of what the group score of M would be based on the current scoring history of M (a value in the range [0.0, 1.0])
synthetronLevel(M): synthetron level associated with M. Set initially to 0 users
U: a user participating in the discussion
perfScore(U): the performance score of a user based on the history of the scored statements broadcasted by the user
MxSc: the current maximum performance score among all the users participating in this discussion
Levels
L: Synthetron level, i.e. the level a synthetron has reached
qThreshold(L): Threshold of number of participants having scored a message at which point it would be promoted to the next level L+1
qTotal(L): number of users that have seen statement with synthetron level L (excluding the sender)
The two q values above are calculated following the values in TABLE 1. TABLE 1 shows pairs of qThreshold and qTotal for a given level.
In the following exemplary processes are described each one of which is an embodiment of the present invention.
Process 1—see FIG. 7: User u joins discussion
User u wishes to join the discussion. A random integer r between [0, R−1] is generated. A new slot is inserted at location r and the slots between r and R are moved to the right. In practice this can mean reassigning addresses, e.g. network addresses of the participants in the group to the ring numbers. The new size of the ring R' is set to R+1. User u is associated with slot $S_u$ at index r.
Process 2—see FIG. 8: User u sends statement Mu
User u in slot Su sends a message Mu which gets broadcasted to other users occupying slots in neighbours(Su). Message Mu is added to the list messageList(Su) and to all the lists messageList($S_i$) for slots i neighbours of slot $S_u$
Process 3—see FIG. 9: Updating the score of message Mu sent by user u
Let n be the number of people having scored Mu, a be the sum of all scored of Mu,
p=(qTotal(Mu)−n)/2.
Update group score: groupScore'(Mu)=a/n
Update the predicted score: predictedScore'(Mu)=(a+p*groupScore'(Mu)/2)/(n+p)
If |groupScore'(Mu)*2−1|>T, Mu reaches the next synthetron level:
Update the synthetron level of message Mu:
synthetronLevel'(Mu)=synthetronLevel(Mu)+1
Update user's performance score:
Let sc(M)=synthetronLevel'(M)*|2*groupScore(M)−1|
perfScore'(u)=perfScore(u)+sc(Mu)
Update the MxSc (max user perf. Score):
if perfScore'(u) is greater than MxSc update it to this value
Inform the users of the new values for the perf. scores for user u and if MxSc has changed, to everyone.
message Mu gets broadcasted to next set of neighbours:
Let v'(u)=qTotal(synthetronLevel'(u)) and v(u)=qTotal(synthetronLevel(u))
then the next set of neighbours is
neighbours($S_u$, v'(u))−neighbours($S_u$, v(u))
Message Mu is added to all the lists messageList($S_i$) for the slots i part of the next set of neighbours of slot $S_u$

OTHER EMBODIMENTS

In a preferred embodiment of this invention participants are assigned places or slots in a ring. Other alternative embodiments are included within the scope of the present invention even if some desirable properties of the discussion are not included. For example no ring is required. It is only necessary to have an algorithm with which to decide on neighbour groupings and an algorithm of how to propagate successfully through the network.

A desirable requirement for organizing neighbour groupings should be such that there is a sense of symmetry in the conversation among participants. That is, if a participant p sees a statement of a participant q, because p is in the neighbour set of q, then p should be able to reply with another statement and q should be able to see it because p would be in the neighbour set of q.

An additional desirable requirement for organizing the neighbour groupings should be such that the local context of a statement is persistent within the conversation. That is, most of the statements that a participant p sees should overlap significantly with those statements that any of the participants in his/her neighbour set sees. That way, the statements sent by participant p should have the correct context to his/her neighbours.

There are a variety of methods that we can envision that hold to a greater or lesser degree the desirable requirements as described above. As it is explained below, the ring method presented herein is such that both requirements are met.

The ring can be thought of as a one-dimensional wrapped array of slots. In this case, the neighbours of a specific slot S correspond to a range d of slots centred around S in the array. In a similar manner, discussion spaces are included within the scope of the present invention that are organised as an n-dimensional wrapped matrix of slots (where n is 2 or more). The neighbours of a slot S in these n-dimensional matrices are the slots inside the n-dimensional sub-matrix of side d whose centre is the slot S.

In the case of the ring, two adjacent participants placed in two adjacent slots S1 and S2 share all but one neighbour and in this way it satisfies both requirements of symmetry and persistence of context because when the participant associated with slot S1 sends a statement in the context of what his neighbours have said, S2, also a neighbour of S1, would understand the context of the statement (the participant associated with slot S2 has had almost the same conversation with all but one the neighbours of S1). In the case of n-dimensional matrices, the number of shared neighbours of adjacent neighbours (in one of the dimensions) may be less than what it would be if they would be placed in a ring and therefore the persistence of context would be met to a lesser degree. Indeed, the number of neighbours not shared for the ring case is 1 whereas in the case of the n-dimensional case, is at least n.

The slots themselves do not have to be organized in a wrapped array, e.g. like a ring or a matrix, but instead they can be nodes of a graph whose edges represent the relation of being-a-neighbour. In this case, the graph should preferably be such that neighbours should have a high degree of shared neighbours in order for the persistence of context requirement to be met. In the case of a graph, a statement sent by a participant associated with a node (slot) Sn would be shown to his neighbours as defined by the being-a-neighbour property of the edges. As with the ring, neighbours for the participant associated with node Sn would determine if a statement sent by the participant is worth propagating further. If the statement should be propagated (becomes a synthetron) then the propagation would proceed to the neighbours' neighbours of the participant (participants associated with nodes 2 degrees apart from node Sn).

Breakout Rooms

A preferred embodiment of this invention is to associate a participant to a slot in a ring. An alternative embodiment would be to associate multiple participants to the same slot, i.e. to treat a slot like a bucket of participants and have fixed participant boundaries for the slots. For this alternative embodiment, statements sent by a participant associated with a slot S would be first sent to the other participants associated with slot S. If these participants determine that the statement should be further propagated, then it would be sent to the participants associated to slots adjacent to slot S. As with the preferred embodiment, the statement would be further propagated through the participants associated with these bucket-like slots as the new participants determine further that it should continue propagating. With this specific embodiment, it becomes more involved to add and remove participants from the discussion because it is not desirable to have slots (buckets) with too few participants.

Continuous Propagation

In one embodiment of the present invention presented herein, a statement sent by a participant p associated to slot S in the ring would be sent to an initial set of participants neighbours of p (in slots adjacent or near S). If this initial set determines that the statement is worth further propagating, i.e. it becomes a synthetron at this level, then the statement would be sent to an additional set. If additional participants determine that it should be propagated then it would again be further propagated and so on. As presented herein, the criterion or criteria to determine if a statement should be further propagated can optionally depend on the ratio of participants that have seen the statement to those that rated highly and on the overall (average) rating of the statement. The number of participants that the statement propagates to follows a series of stages in a progression that leaves the additional number of participants in each level the same or increasing, e.g. a geometric progression that doubles every time a new level is reached. That is, initially, only d nearest neighbours get to see the statement, then the next d nearest neighbours, then the next 2d neighbours, then the next 4d neighbours and so on until either the ratings do not justify further propagation or everyone in the discussion have seen the statement. There is a variety of progressions that we can use for the series of stages in the progression. A geometric progression as in the example above is desirable in that the statements propagate virus-like when they are highly rated. Other types of progression such as arithmetic progressions are envisaged within the scope of the invention. In an arithmetic progression propagation is to d more neighbours at every stage having a net effect of a more measured propagation where participants can have a longer and more thorough discussions or exponential progressions where the ratio of participants having rated a statement to those seeing it is kept constant (e.g., twice as many participants see a statement as those that have already rated it). Algebraic progressions are also included within the scope, e.g. where the extra numbers of participants at each level is defined by an algebraic equation such as $ax^2+b$, where x is the level number and a and b are constants. Geometric, algebraic and arithmetic propagation rules are examples of analytic functions sued to generate propagation rules. The present invention includes use of a simple look-up in which the number of additional participants at each level to which a statement is to be propagated is simply defined in the table in any way which is found advantageous.

In another embodiment of the present invention, the propagation of synthetrons (i.e. statements deemed worth propagating) does not proceed by stages but continuously as the participants see and submit their rating for the statement. In this embodiment, a statement of a participant gets sent first to the d nearest neighbours as in the embodiment presented above, but then every time the statement gets a high rating (e.g. above a given scoring threshold and optionally presence threshold), it gets sent to a further number of participants, e.g. 2 more neighbour participants of those that have not seen the statement already. The net result is similar to the embodiment described above in that the propagation, in this embodiment, for a highly rated statement is exponential, but the decision to propagate is simpler and the continuous propagation can produce a more precise depiction of how popular is a statement within the population of participants.

Distributed Design

In one embodiment of the present invention, the statements produced by participants in a local client running at the participant's computer gets sent to a centralized server that decides who it should forward to among the other participants in the discussion. When forwarding a participant statement, the centralized server sends it to the relevant clients running in the computers being used by the participants that should be receiving the statement. The decision to whom to send the participant statement and at what point is being taken centrally at the server.

In another embodiment of the present invention the communications network is organized in a more distributed manner as a peer-to-peer network. In this embodiment, every client running in a participant computer is virtually connected to a number, e.g. two other clients running in computers of neighbouring participants. These connections between participant clients can be such that all the clients form a virtual ring. When a participant p produces a statement, the participant client forwards 2 copies of the statement labelled LEFT and RIGHT (as the direction of propagation) to its 2 neighbouring left and right clients respectively in the virtual ring. When one of the participant rates highly a statement that he sees, its corresponding client would create 2 copies of the statement and forward it in the labelled direction of the propagation (LEFT or RIGHT) and, in addition, send an update of rating to the client originating the statement in the opposite of the labelled direction. The originating client would collect the statistics of the statements that were sent by its participant. If a participant client receives a copy of a statement that it has already seen, then it would forward it again to a neighbouring client in the labelled direction of propagation. If a participant client receives a copy of a statement that it has already seen with a label of propagation different than the one already seen, then it will remove that copy.

An advantage of this embodiment is that all the messages go through the peers and they are mostly local messages to the nearest neighbours because not all the statements become synthetrons, so in this way a centralized server does not get overloaded with processing requests and uses communication bandwidth while communicating with all the participant clients. A centralized server might still be provided to collect the aggregate information for the reporting of the summary. Clients may report to the centralized server regularly the statistics of synthetron statements so as to keep a running overall rating of the synthetrons. It is understood that the proposed protocol is not the only possible embodiment for a distributed implementation of the current invention as it can be optimized by one skilled in the art so as not to forward as many messages in between peer clients.

Non Linear Propagation

In one embodiment presented in this invention, statements get propagated to participants following linearly the sequence of the neighbouring slots in the ring. However, alternative embodiments would allow propagating the statements in a non-linear fashion based on other criteria for propagation. One such embodiment would look at the performance score of the participants and if it is the case that his/her performance score is high, e.g. he/she has produced many synthetrons in the past, then his/her statement would be forwarded not only to his/her neighbouring participants in the ring or matrix but also to other synthetron-producers, e.g. other participants that have high performance scores. In this way synthetron-producer participants get privileged access to information, e.g. synthetrons, generated by other synthetron-producers. Also, the propagation of statements produced by synthetron-producers may be biased by either increasing slightly their propagation rate, e.g. forward the statement to more participants initially, or by allowing them to re-propagate someone else's statement that they think is worth it, as a kind of sponsoring or championing of someone else's statements. Other criteria for biasing the propagation such as those based on corporate or organizational status are included within the scope of this invention.

Sub-Discussions

In some embodiments of the present invention, every statement is assumed to be relevant to the current topic of discussion. However, it might be the case that a topic is inherently complicated and it has to be dealt with in sub-topics. In an alternative embodiment of the present invention, a main topic and a list of sub-topics may be generated. Participants may choose or switch which topic they want to discuss during the course of the discussion. In this case, statements generated within a sub-topic would initially get propagated to those participants subscribed to that topic at that time. Once a highly rated statement might have done the whole round of a subtopic group, it may be allowed to spill over to the main topic and start propagating there. In this way smaller rings or matrices associated to sub-topics are embedded within the main ring or matrix and participants switch between the different embedded rings or matrices while still keeping their relative ring order.

Assigning of Participants to Slots

As described herein in embodiments of the present invention, participants get assigned to slots in an arbitrary manner. However, this might not be desirable for some discussions. Indeed, situations may arise where 2 or more very different populations of participants are required to reach consensus. When organized at random, they might have, on average, a hard time reaching a consensus because a participant of one population might have his statements shut down by members of the other populations. In alternative embodiments, the placement of participants, i.e. the way the initial set of neighbours is determined, can be based on different criteria of why they should be neighbours or near each other in the ring. One such embodiment might look into the instant messaging friends or frequent email correspondents to create a kind of distance function between participants and then lay them out in such a way that participants that have a small distance with the chosen function are placed near and those that have high distances are placed further apart in the ring. The distance function might be calculated using preferences of the participants themselves as to whom they would like to be near to in the ring, based on demographic data that might be collected by asking some questions or in already known history of the participants. One other embodiment includes allowing the participants to choose sets of already-produced synthetrons and re-place them in the ring close to those participants that produced such synthetrons.

Contentious Statements

In embodiments presented in this invention, the rating by a participant to a statement that he/she sees is a binary decision: agree or disagree, or a continuous range between disagree and agree. This particular rating scale can be mapped into a number between $[-1,1]$, $-1$ corresponding to fully disagree, 0 to no-comment or not useful or do not know and 1 to fully agree, with all the nuances in between (e.g., partly disagree, partly agree, etc.). A statement is deemed valid for further propagation when the absolute value of the average rating is above a chosen threshold. A strict threshold would let pass only those statements that are really very highly rated which might be useful in discussions where sharp conclusions are needed. A loose or low threshold might let pass a wider variety of statements and it might be useful for more brainstorming type of discussions. However, this particular technique as described herein would only select statements that show consensus. Indeed, if a statement is rated by two participants as 'fully agree' and by other two participants as 'fully disagree', then the net result would be that it is discarded and not considered further for propagation. These types of controversial statements might also be useful in some kind of discussions and therefore an alternative implementation might be to take the average of the absolute value of the ratings. That way, both controversial and consensus statements would be deemed valid for propagation and also to be included in the summary of the discussion. Of course, then the reporting of the results might not be any more statements like '31 agree that . . . ' but more like '15 agree and 4 disagree that . . . '.

Alternative Scales for Rating

In embodiments presented in this invention, the rating of the statement is given in a continuous scale between 'disagree' and 'agree'. Within the scope of the present invention, other scoring schemes are included, e.g. the ratings might be discrete values, other scales or combinations of them. One embodiment can involve the combination of 2 scales, one for agreement (disagree to agree which would map to a scale of $[-1,1]$) and the other one for relevance (irrelevant to relevant which would map to a scale of $[0,1]$). In this case, the combined scale might select a statement for propagation only when the rating on both scales is above certain threshold.

Presence-Based

In embodiments of the present invention, one option is that the discussion is happening in real time, much like a chat-like discussion and that the participants are all present online at the same time participating in the discussion. However, the synchronous nature of these embodiments is not an essential feature of this invention. Indeed, in an alternative embodiment the techniques of the present invention are implemented offline, e.g. a participant may send a statement by email to a central server, which in turn would forward it to other participants, again using email, and these in turn would send the ratings to the server through email. Alternatively, the present invention is implemented as an offline application on a mobile phone or wireless enabled PDA as a WAP (Wireless Access Protocol) based application which sends alphanumeric Short Messages using the Short Message Service (SMS) as supported by the European GMS mobile phone system, to the neighbours. In these alternative embodiments, the statements can be coming with some delay and all the participants might not be all participating at the same time but in an extended period of say, a few days or weeks, consensus can still be obtained. During this time the conversation is considered to be "open". An advantageous feature of the present invention is the concept of "presence". Indeed, even though the participants might not be all at the same time participating in the offline, e.g. email-based embodiment, they all have to be considered as present or part of the discussion and therefore being allocated a slot in the ring or matrix. When a participant does not want to participate, he/she has to inform the server that this is the case, or the server might assume that this is the case because it has not seen any ratings for statements forward it to him/her for a while. For example, in online embodiments, where special software is installed on a terminal to perform the present invention, closing down this software (e.g. switching off the computer) can automatically send a message to a server that the participant is logged off. Hence, the present invention includes in all the embodiments of the invention that there is a means of determining presence. Presence may be determined by a variety of means, e.g.

a) heartbeat—a server sends a message or signal which requires response from a client terminal when it is connected and the discussion software is running. If the expected response fails to arrive within a time out period, measured by a timer, the participant is deleted from the discussion.

b) A timer measures the elapsed time since the last message was sent to a participant. If this time exceeds a timeout, the participant is deleted from the group.

c) A notification from the participant or participant client when the participant is joining and leaving the discussion.

The participants that are part of the discussion, i.e. present, are expected to follow the minimal protocol of at least rating the statements of that they receive.

System Implementation

Figure 5:
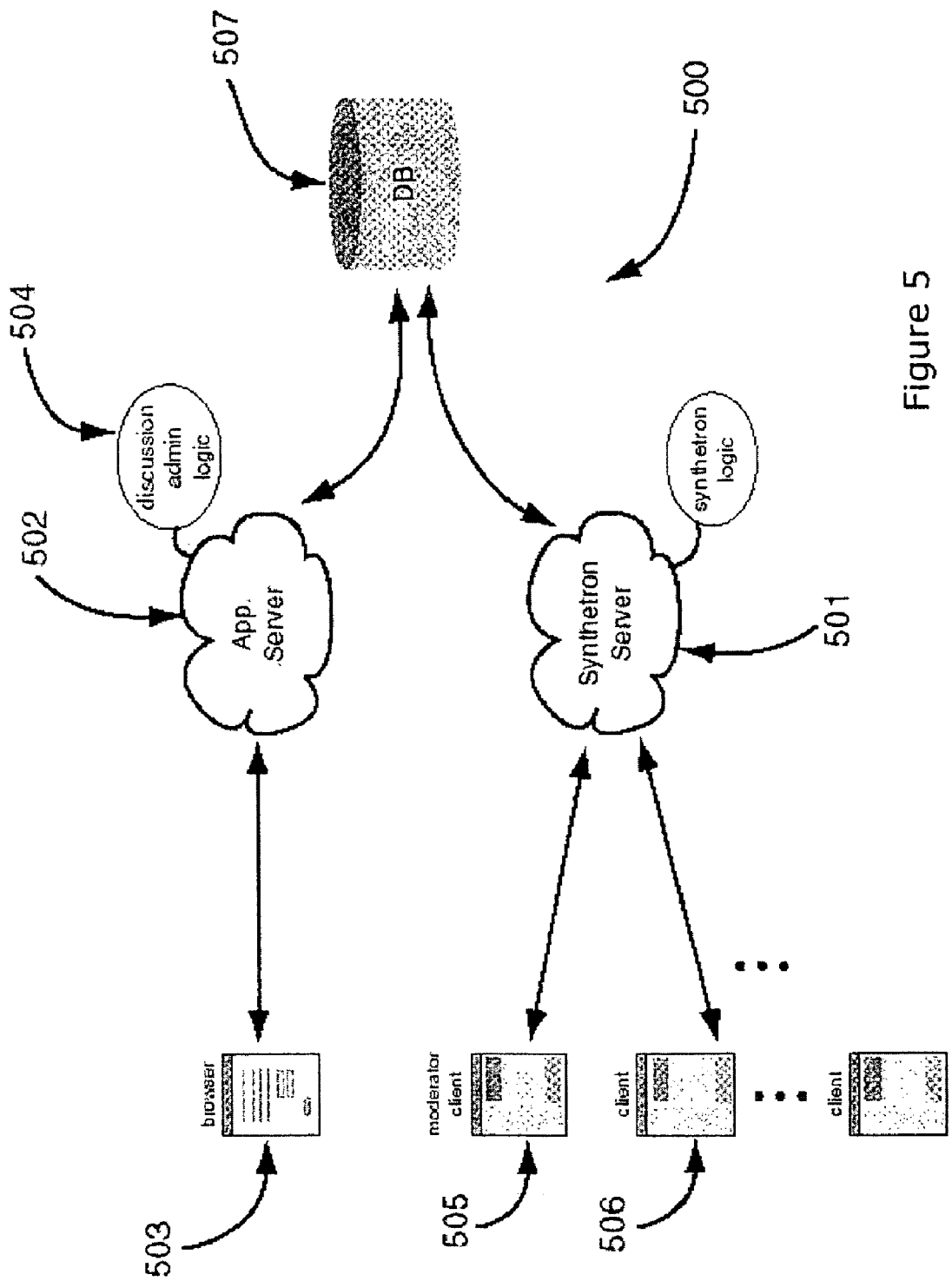
FIG. 5 shows an architecture 500 for a system that would implement an embodiment of the present invention.

FIG. 5 shows an architecture 500 for a system that is an embodiment of the present invention. The logic of the application resides in the synthetron server 501, i.e. software for carrying out logical steps of the application runs on a suitable processing engine on server 501. The administration logic 504 resides in the application server 502, i.e. software for carrying out administrative steps of the application runs on a suitable processing engine on server 502. An administrator of the discussion initially creates a discussion through a browser 503 that would receive administration pages sent by the administration application 504. Through these pages, the administrator can assign a time for the discussion, the participants that should attend and other relevant data. Through a separate client, the moderator of discussion, which could be the same person as the administrator, would use the moderator client 505 and start the discussion. At this point, participants, by using client 506 would connect to the discussion running on server 501 and start sending statements, which would be sent to the synthetron server 501. This server in turn would route those messages to the relevant clients in accordance to the techniques described above in the present invention. The database 507 keeps tables for the users (participants), the statements, the slots and the administrative data as specified above. As will be apparent to one of skill in the art, it should be understood that this process is applicable to the implementation of all aspects of the present invention, and this system can be replicated to support any system in accordance with the present invention. Of course, one of skill in the art will recognize that although the process shown in FIG. 5 is one preferred process of the present invention, it is by no means the only process on which the present invention can be implemented. The system may be implemented using other processes effective for accomplishing the features and operation of the system as described herein.

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, various aspects of the present invention may be implemented on specially configured routers or servers. A general architecture for some of these machines will appear from the description given below.

In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 6:
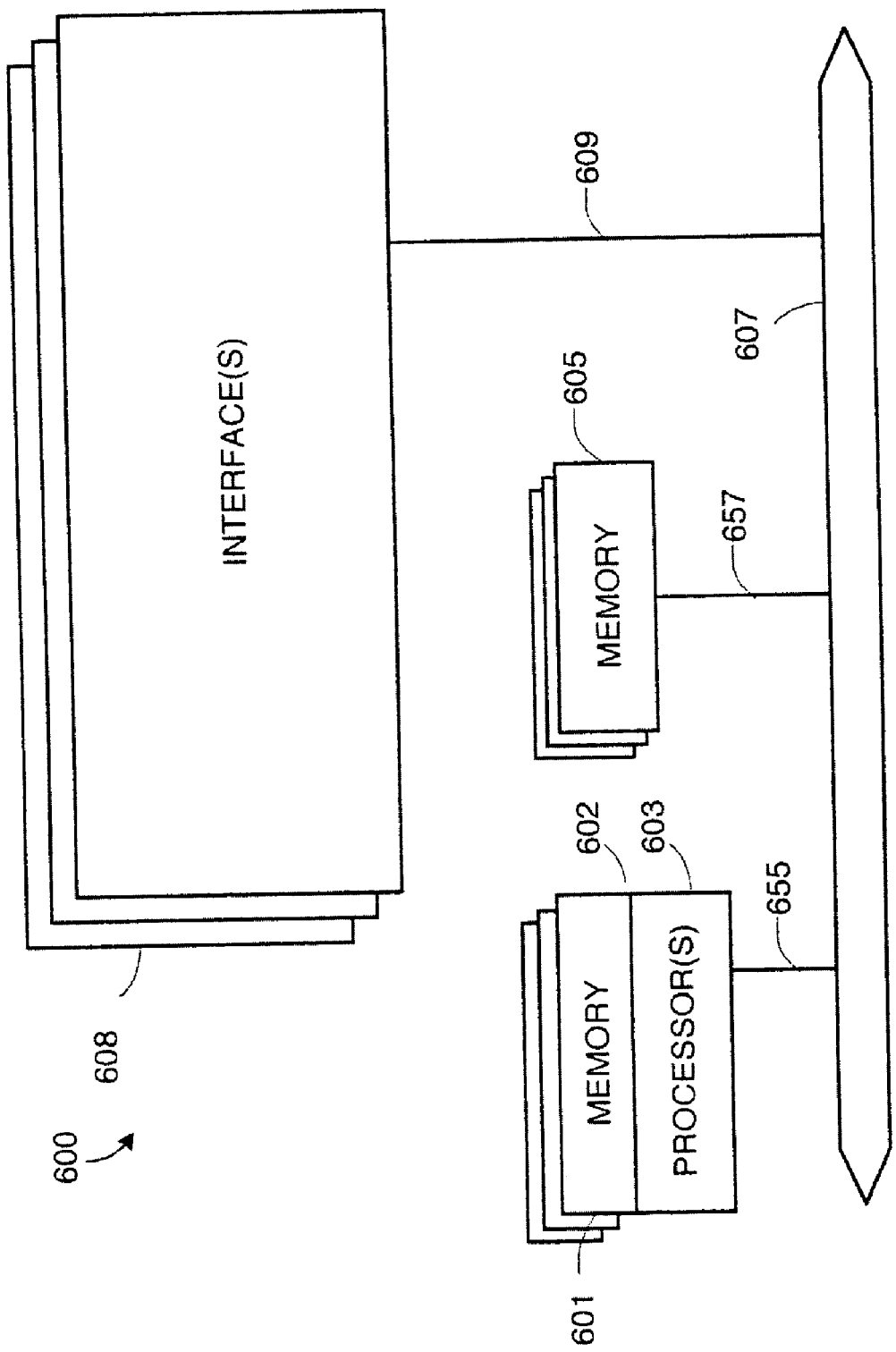
FIG. 6 shows an architecture for a network element that would implement an embodiment of the present invention.

Referring now to FIG. 6, a network device 600 suitable for implementing the techniques of the present invention includes a master central processing unit (CPU) 602, interfaces 608, and a bus 607 (e.g., a PCI bus). When acting under the control of appropriate software or firmware, the CPU 602 may be responsible for implementing specific functions associated with the functions of a desired network device. For example, when configured as a server device, the CPU 602 may be responsible for analyzing packets, encapsulating packets, forwarding packets to appropriate network devices, responding to HTTP requests, etc. The CPU 602 preferably accomplishes all these functions under the control of software including an operating system (e.g. Windows NT), and any appropriate applications software. CPU 602 may include one or more processors 603 such as a processor from the Motorola family of microprocessors or the MIPS family of microprocessors. In an alternative embodiment, processor 603 is specially designed hardware for controlling the operations of network device 600. In a specific embodiment, a memory 601 (such as non-volatile RAM and/or ROM) also forms part of CPU 602. However, there are many different ways in which memory could be coupled to the system. Memory block 601 may be used for a variety of purposes such as, for example, caching and/or storing data, programming instructions, etc.

The interfaces 608 are typically provided as interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, OSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors the communications intensive tasks, these interfaces allow the master microprocessor 602 to efficiently perform routing computations, network diagnostics, security functions, etc.

Although the system shown in FIG. 6 illustrates one specific network device of the present invention, it is by no means the only network device architecture on which the present invention can be implemented. For example, an architecture having a single processor that handles communications as well as routing computations, etc is often used. Further, other types of interfaces and media could also be used with the network device. Regardless of network device's configuration, it may employ one or more memories or memory modules (such as, for example, memory block 605) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

According to specific embodiments, the techniques of the present invention may be implemented using well-known, conventional platforms such as, for example, Java and Jini. Further, according to different embodiments, the technology of the present invention may either be adopted as an ASP or via a software license. In a specific embodiment, the technique of the present invention may be implemented on a server system that is accessible by Intranet, WAN or Internet end-users.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

What is claimed is:

1. A data communications network based system for providing mechanisms for enabling a discussion about a chosen topic, wherein a plurality of participants of a group participate in a group discussion, said plurality of participants being divided into a plurality of overlapping subsets of neighboring participants, said overlapping subsets each includes at least one member in common with another subset the system comprising:

a. terminals communicating with the data communications network, each terminal including at least one computer processor and means for said-one of said participants to contribute a statement on a topic; each said terminal also providing means for enabling said one of said participants to rate the statement by assigning a value or code to the statement when said statement has been broadcast to said terminal, whereby a plurality of said terminals enables a plurality of said participants to assign more than one said value or code to the statement, and wherein said more than one said value or code is referred to hereinafter as a plurality of said values or codes to the statement, b. means for sending the statement via the data communications network to an initial one of said overlapping subsets of the participants of the group, wherein said initial one of said overlapping subsets of participants includes a unique set of neighbors of said one of said participants who contributed the statement, c. a controlling mechanism for controlling whether the statement is propagated via the data communications network to an ever increasing number of the rest of the participants of the group according to a first criterion that depends upon the values or codes assigned to the statement by the participants to whom the statement has been sent, such that:

if said first criterion is met based upon the values or codes assigned to the statement by said neighbors of said one of said participants who contributed said statement, then said statement is propagated to a first number of said participants that is greater than a number of said neighbors and, if said first criterion is again met based upon the values or codes assigned to the statement by said first number of said participants, then said statement is propagated to a second number of said participants that is greater than said first number of participants, said propagation to ever increasing numbers of said participants continuing as long as said first criterion is met until said statement has been propagated to each of said plurality of participants, and said propagation to ever increasing numbers of said participants ending whenever said first criterion is not met, c1. wherein said controlling mechanism initially determines whether the statement should be sent to a first number of participants outside said initial one of the overlapping subsets based on assignment of said values or codes to the statement by participants in the initial one of the overlapping subsets, c2. wherein said controlling mechanism subsequently determines whether the statement should be sent to a second number of participants other than participants to whom the statement has already been sent based on assignment of said values or codes that have been assigned to the statement by the participants in said first number of participants and said initial one of the overlapping subsets to whom the statement has already been sent, d. means to determine the extent the statement has propagated through the group, and means to determine that at least one statement has been collectively selected, e. whereby determining selection of the at least one statement depends on the extent the at least one statement has propagated through the group.

2. The system according to claim 1, wherein the control mechanism has:

means to group the participants in initial subsets, means to allow each member of an initial subset to receive statements submitted for the first time by only a member of that initial subset, means for selecting the initial subsets such that there are at least two subsets whose member participants differ by less than 5 participants, preferably less than 3 participants, more preferably less than 2 participants and most preferably less than one participant.

3. The system according to claim 2, the means for selecting the initial subsets selects the subsets such that for each first initial subset there is at least one other subset whose member participants differ from the first initial subset by less than 5 participants, preferably less than 3 participants, more preferably less than 2 participants and most preferably less than one participant.

4. The system according to claim 1, wherein the means for selecting the initial subsets selects the subsets such that if a first participant can receive a statement from a second participant, the second participant can receive a statement from the first participant.

5. The system according to claim 1, wherein the means for assigning of a code or value to a statement includes means for assigning one of two or more codes.

6. The system according to claim 1, wherein the means for assigning of a code or value to a statement includes means for assigning one of a plurality of values between two extreme values.

7. The system according to claim 1, wherein control mechanism controls further propagation of a statement depends upon a second criterion.

8. The system according to claim 7, wherein the control mechanism has means for determining the fraction of the initial subset that have assigned a value or code to the relevant statement and the second criterion is related to the fraction of the initial subset that have assigned a value or code to the relevant statement.

9. The system according to claim 1, further comprising means for string addresses of the participant, the control mechanism organizing the addresses in a logical ring.

10. The system according to claim 9, wherein the control mechanism associates each address of said participants to a slot in the logical ring and the initial subset to which a respective one of said participants belongs is selected as being plus/minus a certain number to slots starting from the slot assigned to the respective one of said participants.

11. The system according to claim 1, further comprising means for determining whether respective ones of said participants are still actively present in the group.

12. The system according to claim 1, further comprising means for rating said one of said participants depending upon statements submitted by said one of said participants to the discussion.

13. The system according to claim 12, wherein said means for rating said one of said participants rates said one of said participants based on a success of statements made by said one of said participants being propagated to the rest of the group.

14. The system according to claim 1, wherein the control mechanism determines a rate at which statements are propagated to the ever increasing number of the rest of the participants to be arithmetically or algebraically or geometrically or exponentially increasing.

15. A method providing mechanisms for enabling a data communications network based discussion about a chosen topic, wherein a plurality of participants participate in the discussion, said plurality of participants being divided into a plurality of overlapping subsets of neighboring participants, said overlapping subsets each including at least one participant who is also a member of another subset, comprising:

a, providing each participant with a terminal having means for contributing or rating a statement on a topic, said rating being made by assigning a value or code to the statement, wherein more than one said value or code may selectively be assigned to said statement by multiple participants at a plurality of said terminals, and wherein more than one said value or code is referred to hereinafter as a plurality of said values or codes;

b, sending this statement via the data communications network to an initial one of said overlapping subsets of the participants, wherein said initial one of said overlapping subsets of participants includes a unique set of neighbors of a participant who contributed the statement, c1, determining whether to send the statement to a first number of participants outside said initial one of the overlapping subsets based on assignment of said values or codes to the statement by participants in the initial one of the overlapping subsets, c2. if said statement is sent to said first number of participants outside said initial one of the overlapping subsets, subsequently determining whether to send the statement to a second number of participants other than participants to whom the statement has already been sent, based on assignment of said values or codes that have been assigned to the statement by the participants in said first number of participants and said initial one of the overlapping subsets to whom the statement has already been sent wherein a statement of one of said participants on said topic is propagated via the data communications network to an ever increasing number of the rest of the participants according to a first criterion that depends upon the values or codes assigned to the statement by the participants to whom the statement has been sent, to thereby collectively select at least one statement, and the resulting values or codes assigned by the increased number of participants are used to determine whether a number of participants to whom the statement is propagated should be further increased, such that:

if said first criterion is met based upon the values or codes assigned to the statement by said neighbors of said one of said participants who contributed said statement, then said statement is propagated to a first number of said participants that is greater than a number of said neighbors and, if said first criterion is again met based upon the values or codes assigned to the statement by said first number of said participants, then said statement is propagated to a second number of said participants that is greater than said first number of participants, said propagation to ever increasing numbers of said participants continuing as long as said first criterion is met until said statement has been propagated to each of said plurality of participants, and said propagation to ever increasing numbers of said participants ending whenever said first criterion is not met, d, whereby selection of the at least one statement depends on the extent the at least one statement has propagated through the group.

16. The method according to claim 15, wherein the group of participants is grouped in initial subsets, each member of an initial subset receiving statements submitted for the first time by only a member of that initial subset, further comprising the step of selecting the initial subsets such that there are at least two subsets whose member participants differ by less than 5 participants, preferably less than 3 participants, more preferably less than 2 participants and most preferably less than one participant.

17. The method according to claim 16, the initial subset selecting step being such that for each first initial subset there is at least one other subset whose member participants differ from the first initial subset by less than 5 participants, preferably less than 3 participants, more preferably less than 2 participants and most preferably less than one participant.

18. The method according to claim 15, wherein the group of participants is grouped in initial subsets and selection of initial subsets is such that if a first participant can receive a statement from a second participant, the second participant can receive a statement from the first participant.

19. The method according to claim 15, wherein assigning of a code or value to a statement includes assigning one of two or more codes.

20. The method according to claim 15, wherein assigning of a code or value to a statement includes assigning one of a plurality of values between two extreme values.

21. The method according to claim 15, wherein further propagation of a statement depends upon a second criterion.

22. The method according to claim 21, wherein the second criterion is related to the fraction of the initial subset that have assigned a value or code to the relevant statement.

23. The method according to claim 15, wherein addresses of participants in a communications network for the network based discussion are organized in a logical ring.

24. The method according to claim 23, wherein each address of said participants is assigned a slot in the logical ring and the initial subset to which a participant belongs is selected as being plus/minus a certain number to slots starting from the slot assigned to the participant.

25. The system according to claim 16, further comprising means for determining whether respective ones of said participants are still actively present in the group.

26. The system according to claim 15, further comprising means for rating said one of said participants depending upon statements submitted by said one of said participants to the discussion.

27. The system according to claim 26, wherein said means for rating said one of said participants rates said one of said participants based on a success of statements made by said one of said participants being propagated to the rest of the group.

28. The method according to claim 15, wherein a rate at which statements are propagated to the ever increasing number of the rest of the participants is arithmetically or algebraically or geometrically or exponentially increasing.

29. A non-transitory computer readable medium on which is stored a software computer product comprising code which when executed on a processing engine controls a group of communications between a plurality of participants of a group participating in a group discussion about a chosen topic, said plurality of participants being divided into a plurality of overlapping subsets of neighboring participants, said overlapping subsets each including at least one participant who is also a member of another subset, comprising code for:
providing the participants with means for contributing a statement on a topic and means for allowing this statement to be sent to an initial one of said overlapping subsets of the participants, said initial one of said overlapping subsets of participants including a unique set of neighbors of one of said participants who contributed the statement, and providing each of said participants of the group with means to rate a statement by assigning a value or code to that statement,
propagating said statement of said one of said participants on said topic to an ever increasing number of the rest of the participants according to a first criterion that depends upon the values or codes assigned to the statement by the participants to whom the statement has been sent, the code for propagating said statement including code for:
initially determining whether the statement should be sent to a first number of participants outside said initial one of the overlapping subsets based on assignment of said values or codes to the statement by participants in the initial one of the overlapping subsets,
subsequently determining whether the statement should be sent to a second number of participants other than participants to whom the statement has already been sent based on assignment of said values or codes that have been assigned to the statement by the participants in said first number of participants and said initial one of the overlapping subsets to whom the statement has already been sent, such that:
if said first criterion is met based upon the values or codes assigned to the statement by said neighbors of said one of said participants who contributed said statement, then said statement is propagated to a first number of said participants that is greater than a number of said neighbors and,
if said first criterion is again met based upon the values or codes assigned to the statement by said first number of said participants, then said statement is propagated to a second number of said participants that is greater than said first number of participants,
said propagation to ever increasing numbers of said participants continuing as long as said first criterion is met until said statement has been propagated to each of said plurality of participants, and said propagation to ever increasing numbers of said participants ending whenever said first criterion is not met.

30. The non-transitory computer readable mediums according to claim 29 further comprising code for: determining that at least one statement has been collectively selected, whereby selection of the at least one statement depends on the extent the at least one statement has propagated through the group.

31. A network element for use in a communications network providing mechanisms for enabling a discussion about a chosen topic, wherein a group of a plurality of participants of a group participate in the group discussion using terminals in communication with the network, said plurality of participants being divided into a plurality of overlapping subsets of neighboring participants, said overlapping subsets each including at least one participant who is also a member of another subset, the network element comprising:
a, means for receiving a statement on a topic from a participant terminal,
b, means for sending this statement to an initial subset of the participant terminals belonging to one of said overlapping subsets of neighboring participants that includes a unique set of neighbors of a participant who contributed the statement, and means for receiving from a participant terminal a value or code rating a statement,
c, a controlling mechanism including at least one computer processor for controlling whether a statement of one of said participants on said topic is propagated to an ever increasing number of the rest of the participants according to a first criterion that depends upon the values or codes assigned to the statement by the participants to whom the statement has been sent,
c1. wherein said controlling mechanism initially determines whether the statement should be sent to a first number of participants outside said initial one of the overlapping subsets based on assignment of said values or codes to the statement by participants in the initial one of the overlapping subsets, c2. wherein said controller controlling mechanism subsequently determines whether the statement should be sent to a second number of participants other than participants to whom the statement has already been sent based on assignment of said values or codes that have been assigned to the statement by the participants in said first number of participants and said initial one of the overlapping subsets to whom the statement has already been sent, such that:

if said first criterion is met based upon the values or codes assigned to the statement by said neighbors of said one of said participants who contributed said statement, then said statement is propagated to a first number of said participants that is greater than a number of said neighbors and, if said first criterion is again met based upon the values or codes assigned to the statement by said first number of said participants, then said statement is propagated to a second number of said participants that is greater than said first number of participants, said propagation to ever increasing numbers of said participants continuing until said statement has been propagated to each of said plurality of participants or until said first criterion is not met, d, means to determine the extent the statement has propagated through the group, and means to determine that at least one statement has been collectively selected, e, whereby determining selection of the at least one statement depends on the extent the at least one statement has propagated through the group.

* * * * *